United States Patent
Zhao

(10) Patent No.: US 12,047,988 B2
(45) Date of Patent: Jul. 23, 2024

(54) METHOD AND APPARATUS FOR SENDING RESPONSE INFORMATION, STORAGE MEDIUM, AND ELECTRONIC DEVICE

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 515 days.

(21) Appl. No.: 17/274,034

(22) PCT Filed: Sep. 7, 2018

(86) PCT No.: PCT/CN2018/104691
§ 371 (c)(1),
(2) Date: Mar. 5, 2021

(87) PCT Pub. No.: WO2020/047865
PCT Pub. Date: Mar. 12, 2020

(65) Prior Publication Data
US 2021/0345351 A1  Nov. 4, 2021

(51) Int. Cl.
*H04W 72/541* (2023.01)
*H04W 24/08* (2009.01)
*H04W 72/20* (2023.01)

(52) U.S. Cl.
CPC ......... *H04W 72/541* (2023.01); *H04W 24/08* (2013.01); *H04W 72/20* (2023.01)

(58) Field of Classification Search
CPC .................................................. H04W 72/541
See application file for complete search history.

(56) References Cited

U.S. PATENT DOCUMENTS

| | | | |
|---|---|---|---|
| 10,028,125 B2 | 7/2018 | Chen et al. | |
| 10,778,387 B2 | 9/2020 | Maaref | |
| 2013/0194984 A1 | 8/2013 | Cheng et al. | |
| 2016/0044689 A1 | 2/2016 | Wen et al. | |
| 2016/0100412 A1* | 4/2016 | Shin ...................... | H04W 76/14 370/336 |
| 2016/0345297 A1 | 11/2016 | Chen et al. | |

(Continued)

FOREIGN PATENT DOCUMENTS

| CN | 103338497 A | 10/2013 |
|---|---|---|
| CN | 104796845 A | 7/2015 |

(Continued)

OTHER PUBLICATIONS

International Search Report in the international application No. PCT/CN2018/104691, mailed on Jun. 13, 2019.

(Continued)

*Primary Examiner* — Jason E Mattis
(74) *Attorney, Agent, or Firm* — Syncoda LLC; Feng Ma

(57) ABSTRACT

A method for transmitting response information includes: a location of a time frequency resource for the transmission of the response information by a data receiver of user data during response information transmission is determined; the location of the time frequency resource for the transmission of the response information is indicated to the data receiver; and response information transmitted by the data receiver is received at the location of the time frequency resource.

27 Claims, 4 Drawing Sheets

(56) References Cited

U.S. PATENT DOCUMENTS

| | | | |
|---|---|---|---|
| 2018/0035406 A1 | 2/2018 | Hao et al. | |
| 2018/0049129 A1* | 2/2018 | Li | H04W 52/0235 |
| 2018/0145805 A1 | 5/2018 | Maaref | |
| 2019/0052436 A1* | 2/2019 | Desai | H04W 72/0446 |
| 2019/0116586 A1* | 4/2019 | Basu Mallick | H04W 72/02 |
| 2019/0132804 A1* | 5/2019 | Hong | H04W 52/46 |
| 2021/0234643 A1* | 7/2021 | Wang | H04W 72/044 |

FOREIGN PATENT DOCUMENTS

| | | | |
|---|---|---|---|
| CN | 105191459 A | 12/2015 | |
| CN | 105637961 A | 6/2016 | |
| CN | 105992187 A | 10/2016 | |
| CN | 106105275 A | 11/2016 | |
| CN | 106664693 A | 5/2017 | |
| CN | 107872834 A | 4/2018 | |
| CN | 108282879 A | 7/2018 | |
| WO | 2018095297 A1 | 5/2018 | |

OTHER PUBLICATIONS

English translation of the Written Opinion of the International Search Authority in the international application No. PCT/CN2018/104691, mailed on Jun. 13, 2019.

Ducheng Wu, Yuhua Xu, Qihui Wu, "Resource Allocation for D2D Wireless Networks with Asymmetric Social Weighted Graph", IEEE Communications Letters, Dec. 31, 2017.

Lin Qiuhua, "Study On Resource Allocation in D2D Discovery and Communication Tehnologies", Beijing University of Posts and Telecommunications, Dec. 1, 2014.

Zhnag Yan, "Research On the Key Technology of D2D Radio Resource Management in Lte System", Beijing University of Posts and Telecommunications, Dec. 22, 2013.

Ericsson, "UAC information and establishment cause when uplink user data packet is to be sent via a PDU session with suspended user-plane resources" 3GPP TSG-CT WG1 Meeting #111bis C1-184080, Sophia-Antipolis (France), Jul. 9-13, 2018.

Second Office Action of the Chinese application No. 201880001556.9, issued on May 26, 2021.

* cited by examiner

METHOD AND APPARATUS FOR SENDING RESPONSE INFORMATION, STORAGE MEDIUM, AND ELECTRONIC DEVICE

CROSS-REFERENCE TO RELATED APPLICATION

This application is a U.S. national stage of International Patent Application No. PCT/CN2018/104691 filed on Sep. 7, 2018, the disclosure of which is hereby incorporated by reference in its entirety.

TECHNICAL FIELD

The present disclosure relates to the field of communications, and more particularly, to a method and apparatus for transmitting response information, a storage medium and an electronic device.

BACKGROUND

Internet of Vehicles (IoV) communication may effectively enhance traffic safety, improve traffic efficiency and enrich people's travel experience by supporting Vehicle to Vehicle (V2V), Vehicle to Infrastructure (V2 I) and Vehicle to Pedestrian (V2P). In the IoV communication, present base station deployment may be effectively utilized through a cellular communication technology to reduce equipment overhead and provide services guaranteed with Quality of Service (QoS), thereby meeting the needs of IoV services, for example, IoV communication based on a Long-Term Evolution (LTE) network and IoV communication based on a New Radio (NR) network.

In uplink and downlink unicast communication of the IoV communication based on a LTE network and the IoV communication based on a NR network, a Hybrid Automatic Repeat Request (HARQ) mechanism is adopted to ensure the integrity and reliability of data transmission. However, for the uplink and downlink unicast communication of NR/LTE, there is a base station as the center node, and all the uplink and downlink data transmission and response information transmission are scheduled by the base station, so that the transmission between various HARQ response information is ensured, the transmission between HARQ response information and user data is ensured, and there will be no collision of time-frequency resources.

However, for a direct (sidelink) communication system between UE, for example, in IoV direct communication, UE may communicate with each other directly through a direct link, that is, a data transmitter and a data receiver may directly transmit user data through the direct link. Therefore, there is no base station, and transmission of uplink and downlink data and transmission of response information cannot be scheduled by a base station, thus the transmission of response information cannot be carried out.

SUMMARY

To solve the above problem, the present disclosure provides a method and apparatus for transmitting response information, a storage medium and an electronic device.

According to a first aspect of the embodiments of the present disclosure, a method for transmitting response information is provided. In a sidelink communication system, UE communicate directly with each other through a sidelink, and the UE include a data transmitter transmitting user data and a data receiver receiving the user data. The method is applied to the data transmitter in the sidelink communication system, and includes: determining a location of a time-frequency resource for response information transmitted by the data receiver of the user data; indicating the location of the time-frequency resource for the transmission of the response information to the data receiver; and receiving the response information from the data receiver at the location of the time-frequency resource.

Optionally, determining the location of the time-frequency resource for the response information transmitted by the data receiver of the user data may include: monitoring information transmission of first other UE than the data transmitter, and determining the location of the time-frequency resource for the transmission of the response information based on a monitoring result; and/or, measuring a signal interference of the first other UE at a target time-frequency resource, and determining the location of the time-frequency resource for the transmission of the response information based on a measurement result.

Optionally, monitoring the information transmission of the first other UE than the data transmitter may include: receiving first control information from the first other UE, the first control information comprising indication information indicating a time-frequency resource for response information transmitted by the first other UE. Determining the location of the time-frequency resource for the transmission of the response information based on the monitoring result may include: determining the location of the time-frequency resource for the transmission of the response information from unoccupied time-frequency resources based on the first control information.

Optionally, measuring the signal interference of the first other UE at the target time-frequency resource may include: measuring a first interference signal parameter of the first other UE at the target time-frequency resource, the first interference signal parameter comprising first interference signal intensity and/or first interference signal energy. Determining the location of the time-frequency resource for the transmission of the response information based on the measurement result may include: obtaining a first interference parameter threshold, and determining the location of the time-frequency resource for the transmission of the response information based on the first interference parameter threshold and the first interference signal parameter.

Optionally, when the first interference signal parameter includes the first interference signal intensity, measuring the first interference signal parameter of the first other UE at the target time-frequency resource may include: measuring first reference signal intensity at the time-frequency resource for the user data and/or first control information transmitted by the first other UE, and estimating a first interference signal intensity at a subsequent time-frequency resource for the first other UE based on the measured first reference signal intensity.

Optionally, the first interference parameter threshold may include a first interference strength threshold. determining the location of the time-frequency resource for the transmission of the response information based on the first interference parameter threshold and the first interference signal parameter may include: determining the location of the time-frequency resource for the transmission of the response information from locations of time-frequency resources at which the first interference signal intensity is less than or equal to the first interference strength threshold.

Optionally, when the first interference signal parameter includes the first interference signal energy, measuring the first interference signal parameter of the first other UE at the target time-frequency resource may include: measuring first received signal energy at the location of the target time-frequency resource, and estimating, based on the measured first received signal energy, first interference signal energy at a first offset time-frequency resource with a time-frequency offset from the target time-frequency resource.

Optionally, the first interference parameter threshold may include a first interference energy threshold and/or a first ratio, the first ratio including a first percentage or a first quantity. determining the location of the time-frequency resource for the transmission of the response information based on the first interference parameter threshold and the first interference signal parameter may include: when the first interference parameter threshold comprises the first interference energy threshold, determining the location of the time-frequency resource for the transmission of the response information from locations of time-frequency resources at which the first interference signal energy is less than or equal to the first interference energy threshold; or when the first interference parameter threshold comprises the first ratio, determining the location of the time-frequency resource for the transmission of the response information from time-frequency resources with minimum first interference signal energy according to the first percentage or the first quantity.

Optionally, obtaining the first interference parameter threshold may include: obtaining the first interference parameter threshold that is preconfigured; and/or when the data transmitter is within a coverage range of a base station, obtaining the first interference parameter threshold configured by the base station through downlink signaling.

Optionally, before receiving the response information from the data receiver at the location of the time-frequency resource, the method may further include: determining transmission power of the data receiver for transmitting the response information, and indicating the transmission power to the data receiver.

Optionally, that the determining the transmission power of the data receiver for transmitting the response information may include: obtaining a target interference signal intensity of the first other UE at the time-frequency resource for the transmission of the response information, and determining the transmission power based on the target interference signal intensity; and/or, obtaining target interference signal energy at the time-frequency resource for the transmission of the response information, and determining the transmission power based on the target interference signal energy.

Optionally, indicating the location of the time-frequency resource for the transmission of the response information to the data receiver may include: indicating a relative distance between the location of the time-frequency resource for the transmission of the response information and the location of the time-frequency resource for the user data corresponding to the response information; or, indicating a resource pool cycle of the time-frequency resource in a resource pool to which the time-frequency resource belongs and indicating the location of the time-frequency resource in the resource pool cycle, the resource pool comprising a resource pool obtained by dividing the time-frequency resources configured by a system according to a preset cycle.

Optionally, the relative distance between the location of the time-frequency resource and the location of the time-frequency resource for the user data corresponding to the response information may include a location space between the time-frequency resource for the transmission of the response information and a time-frequency resource for latest user data in latest transmission.

Optionally, when the multiple data transmissions include repeated transmission of the user data on multiple time-frequency resources, indicating the location of the time-frequency resource for the transmission of the response information to the data receiver may include: indicating a location of a time-frequency resource for transmission of each response information corresponding to each user data to the data receiver; or, merging same user data and indicating a time-frequency resource for the transmission of the response information corresponding to the merged user data to the data receiver.

Optionally, indicating the location of the time-frequency resource for the transmission of the response information to the data receiver may include: including the location of the time-frequency resource for the transmission of the response information into data scheduling information indicating a location of a time-frequency resource of data transmission corresponding to the response information.

Optionally, a time difference between a starting resource unit of the time-frequency resource for the transmission of the response information and an ending resource unit of the time-frequency resource for the user data corresponding to the response information is greater than or equal to a preset time difference threshold.

Optionally, receiving the response information from the data receiver at the location of the time-frequency resource may include: attempting to receive the response information from the data receiver on a location of each time-frequency resource for the transmission of the response information.

According to a second aspect of the embodiments of the present disclosure, a method for transmitting response information is provided. In a sidelink communication system, UE communicate directly with each other through a sidelink, and the UE include a data transmitter transmitting user data and a data receiver receiving the user data. The method is applied to the data receiver in the sidelink communication system, and includes: receiving locations of time-frequency resources for transmission of response information indicated by the data transmitter; determining at least one selected location of time-frequency resource from the locations of the time-frequency resources for the transmission of the response information indicated by the data transmitter; and after receiving the user data from the data transmitter, transmitting the response information to the data transmitter on the at least one selected location of the time-frequency resource.

Optionally, before transmitting the response information to the data transmitter on the at least one selected location of the time-frequency resource, the method may further include receiving transmission power indicated by the data transmitter. Transmitting the response information to the data transmitter on the at least one selected location of the time-frequency resource may include transmitting the response information to the data transmitter based on the transmission power on the at least one selected location of the time-frequency resource.

Optionally, determining at least one selected location of the time-frequency resource from the locations of the time-frequency resources for the transmission of the response information indicated by the data transmitter may include: determining a location of each time-frequency resource for the transmission of the response information as the at least one selected location of the time-frequency resource.

Optionally, determining at least one selected location of the time-frequency resource from the locations of the time-frequency resources for the transmission of the response information indicated by the data transmitter may include:

monitoring information transmission of second other UE than the data receiver, and determining the at least one selected location of time-frequency resource based on a monitoring result; and/or, measuring a signal interference of the second other UE on the locations of the time-frequency resources for the transmission of the response information, and determining at least one selected location of the time-frequency resource based on a measurement result.

Optionally, monitoring the information transmission of the second other UE than the data receiver may include: receiving second control information from the second other UE, the second control information comprising indication information indicating a time-frequency resource for the second other UE. Determining at least one selected location of the time-frequency resource based on the measurement result may include: determining unoccupied time-frequency resources from the time-frequency resources for the transmission of the response information, and determining the at least one selected location of the time-frequency resource from unoccupied time-frequency resources based on the second control information.

Optionally, measuring the signal interference of the second other UE on the locations of the time-frequency resources for the transmission of the response information may include: measuring a second interference signal parameter of the second other UE on the locations of the time-frequency resources for transmission of the response information, the second interference signal parameter comprising second interference signal intensity and/or second interference signal energy. Determining the at least one selected location of the time-frequency resource based on the measurement result may include: obtaining a second interference parameter threshold, and determining the at least one selected location of the time-frequency resource based on the second interference parameter threshold and the second interference signal parameter.

Optionally, when the second interference signal parameter includes the second interference signal intensity, measuring the second interference signal parameter of the second other UE on the locations of the time-frequency resources for the transmission of the response information may include: measuring second reference signal intensity at a time-frequency resource for user data and/or second control information transmitted by the second other UE, and estimating a second interference signal intensity at a subsequent time-frequency resource for the second other UE based on the measured second reference signal intensity.

Optionally, the second interference parameter threshold includes a second interference strength threshold. determining the at least one selected location of the time-frequency resource based on the second interference parameter threshold and the second interference signal parameter may include: determining the at least one selected location of the time-frequency resource from locations of time-frequency resources at which the second interference signal intensity is less than or equal to the second interference strength threshold.

Optionally, when the second interference signal parameter includes the second interference signal energy, measuring the second interference signal parameter of the second other UE on the locations of the time-frequency resources for the transmission of the response information may include: measuring second received signal energy on the locations of the time-frequency resources for the transmission of the response information, and estimating, based on the second received signal energy, second interference signal energy at a second offset time-frequency resource with a time-frequency offset from the time-frequency resources for the transmission of the response information.

Optionally, the second interference parameter threshold includes a second interference energy threshold and/or a second ratio, the second ratio including a second percentage or a second quantity. determining the at least one selected location of the time-frequency resource based on the second interference parameter threshold and the second interference signal parameter may include: when the second interference parameter threshold comprises the second interference energy threshold, determining the at least one selected location of the time-frequency resource from locations of time-frequency resources at which the second interference signal energy is less than or equal to the second interference energy threshold; or when the second interference parameter threshold comprises the second ratio, determining the at least one selected location of the time-frequency resource from time-frequency resources with minimum second interference signal energy according to the second percentage or the second quantity.

Optionally, obtaining the second interference parameter threshold may include: obtaining the second interference parameter threshold that is preconfigured; and/or, when the data receiver is within a coverage range of a base station, configuring the second interference parameter threshold through downlink signaling of the base station.

According to a third aspect of the embodiments of the present disclosure, an apparatus for transmitting response information is provided. In a sidelink communication system, UE communicate directly with each other through a sidelink, and the UE include a data transmitter transmitting user data and a data receiver receiving the user data. The apparatus is applied to the data transmitter in the sidelink communication system and includes: a location determining module, configured to determine a location of a time-frequency resource for response information transmitted by the data receiver of the user data; a location indicating module, configured to indicate the location of the time-frequency resource for the transmission of the response information to the data receiver; and a response information receiving module, configured to receive the response information from the data receiver at the location of the time-frequency resource.

Optionally, the location determining module is configured to monitor information transmission of first other UE than the data transmitter, and determine the location of the time-frequency resource for the transmission of the response information based on the monitoring result; and/or, the location determining module is configured to measure a signal interference of the first other UE at a target time-frequency resource, and determine the location of the time-frequency resource for the transmission of the response information based on the measurement result.

Optionally, the location determining module is configured to receive first control information from the first other UE, and determine the location of the time-frequency resource for the transmission of the response information from unoccupied time-frequency resources based on the first control information, the first control information including indication information indicating a time-frequency resource for response information transmitted by the first other UE.

Optionally, the location determining module is configured to measure a first interference signal parameter of the first other UE at the target time-frequency resource, obtain a first interference parameter threshold, and determine the location of the time-frequency resource for the transmission of the response information based on the first interference parameter threshold and the first interference signal parameter, the first interference signal parameter including first interference signal intensity and/or first interference signal energy.

Optionally, the location determining module is configured to measure first reference signal intensity at a time-frequency resource for user data and/or first control information transmitted by the first other UE, and estimate a first interference signal intensity at a subsequent time-frequency resource for the first other UE based on the measured first reference signal intensity.

Optionally, the first interference parameter threshold includes a first interference strength threshold. The location determining module is configured to determine the location of the time-frequency resource for the transmission of the response information from locations of time-frequency resources at which the first interference signal intensity is less than or equal to the first interference strength threshold.

Optionally, when the first interference signal parameter includes the first interference signal energy, the location determining module is configured to measure first received signal energy at the location of the target time-frequency resource, and estimate, based on the measured first received signal energy, first interference signal energy at a first offset time-frequency resource with a time-frequency offset from the target time-frequency resource.

Optionally, the first interference parameter threshold includes a first interference energy threshold and/or a first ratio, the first ratio including a first percentage or a first quantity. The location determining module is configured to, when the first interference parameter threshold includes the first interference energy threshold, determine the location of the time-frequency resource for the transmission of the response information from locations of time-frequency resources at which the first interference signal energy is less than or equal to the first interference energy threshold; or when the first interference parameter threshold includes the first ratio, determine the location of the time-frequency resource for the transmission of the response information from time-frequency resources with minimum first interference signal energy according to the first percentage or the first quantity.

Optionally, the location determining module is configured to obtain the first interference parameter threshold that is preconfigured; and/or, the location determining module is configured to, when the data transmitter is within a coverage range of a base station, obtain the first interference parameter threshold configured by the base station through downlink signaling.

Optionally, the apparatus may further include: a power determining module, configured to determine transmission power of the data receiver for transmitting the response information, and indicate the transmission power to the data receiver.

Optionally, the power determining module is configured to obtain a target interference signal intensity of the first other UE at the time-frequency resource for the transmission of the response information, and determine the transmission power based on the target interference signal intensity; and/or, the power determining module is configured to obtain target interference signal energy at the time-frequency resource for the transmission of the response information, and determine the transmission power based on the target interference signal energy.

Optionally, the location indicating module is configured to indicate a relative distance between the location of the time-frequency resource for the transmission of the response information and the location of the time-frequency resource for the user data corresponding to the response information; or, the location indicating module is configured to indicate a resource pool cycle of the time-frequency resource in a resource pool to which the time-frequency resource belongs, and indicate the location of the time-frequency resource in the resource pool cycle, the resource pool including a resource pool obtained by dividing the time-frequency resources configured by a system according to a preset cycle.

Optionally, the relative distance between the location of the time-frequency resource and the location of the time-frequency resource for the user data corresponding to the response information may include:
 a location space between the time-frequency resource for the transmission of the response information and a time-frequency resource for latest user data in latest transmission.

Optionally, when the multiple data transmissions include repeated transmission of the user data on multiple time-frequency resources, the location indicating module is configured to indicate a location of a time-frequency resource for transmission of each response information corresponding to each user data to the data receiver; or, the location indicating module is configured to merge the same user data and indicate a time-frequency resource for the transmission of the response information corresponding to the merged user data to the data receiver.

Optionally, the location indicating module is configured to include the location of the time-frequency resource for the transmission of the response information into data scheduling information indicating a location of a time-frequency resource of data transmission corresponding to the response information.

Optionally, a time difference between a starting resource unit of the time-frequency resource for the transmission of the response information and an ending resource unit of the time-frequency resource for the user data corresponding to the response information is greater than or equal to a preset time difference threshold.

Optionally, the response information receiving module is configured to attempt to receive the response information from the data receiver on a location of each time-frequency resource for the transmission of the response information.

According to the fourth aspect of the embodiments of the present disclosure, an apparatus for transmitting response information is provided. In a sidelink communication system, UE communicate directly with each other through a sidelink, and the UE include a data transmitter transmitting user data and a data receiver receiving the user data. The apparatus is applied to the data receiver in the sidelink communication system and includes: a location indication receiving module, configured to receive locations of time-frequency resources for the transmission of the response information indicated by the data transmitter; a resource location determining module, configured to determine at least one selected location of time-frequency resource from the locations of the time-frequency resources for the transmission of the response information indicated by the data transmitter; and a response information transmitting module, configured to, after receiving the user data from the data transmitter, transmit the response information to the data transmitter on the at least one selected location of the time-frequency resource.

Optionally, the apparatus may further include: a power indication receiving module, configured to receive transmission power indicated by the data transmitter; and a response information transmitting module, configured to transmit the response information to the data transmitter based on the transmission power on the at least one selected location of the time-frequency resource.

Optionally, the resource location determining module is configured to determine a location of each time-frequency resource for the transmission of the response information as the at least one selected location of the time-frequency resource.

Optionally, the resource location determining module is configured to monitor information transmission of second other UE than the data receiver, and determine the at least one selected location of time-frequency resource based on a monitoring result; and/or, the resource location determining module is configured to measure a signal interference of the second other UE on the locations of the time-frequency resources for the transmission of the response information, and determine at least one selected location of the time-frequency resource based on a measurement result.

Optionally, the resource location determining module is configured to receive second control information from the second other UE, determine unoccupied time-frequency resources from the time-frequency resources for the transmission of the response information based on the second control information, and determine the at least one selected location of the time-frequency resource from unoccupied time-frequency resources, the second control information including indication information indicating a time-frequency resource for the second other UE.

Optionally, the resource location determining module is configured to measure a second interference signal parameter of the second other UE on the locations of the time-frequency resources for the transmission of the response information, obtain a second interference parameter threshold, and determine the at least one selected location of the time-frequency resource based on the second interference parameter threshold and the second interference signal parameter, the second interference signal parameter including second interference signal intensity and/or second interference signal energy.

Optionally, when the second interference signal parameter includes the second interference signal intensity, the resource location determining module is configured to measure second reference signal intensity at a time-frequency resource for user data and/or second control information transmitted by the second other UE, and estimate a second interference signal intensity at a subsequent time-frequency resource for the second other UE based on the measured second reference signal intensity.

Optionally, the second interference parameter threshold may include a second interference strength threshold. The resource location determining module is configured to determine the at least one selected location of the time-frequency resource from locations of time-frequency resources at which the second interference signal intensity is less than or equal to the second interference strength threshold.

Optionally, when the second interference signal parameter includes the second interference signal energy, the resource location determining module is configured to measure second received signal energy on the locations of the time-frequency resources for the transmission of the response information, and estimate, based on the second received signal energy, second interference signal energy at a second offset time-frequency resource with a time-frequency offset from the time-frequency resources for the transmission of the response information.

Optionally, the second interference parameter threshold includes a second interference energy threshold and/or a second ratio, the second ratio including a second percentage or a second quantity. The resource location determining module is configured to, when the second interference parameter threshold includes the second interference energy threshold, determine the at least one selected location of the time-frequency resource from locations of time-frequency resources at which the second interference signal energy is less than or equal to the second interference energy threshold; or when the second interference parameter threshold includes the second ratio, determine the at least one selected location of the time-frequency resource from time-frequency resources with minimum second interference signal energy according to the second percentage or the second quantity.

Optionally, the resource location determining module is configured to obtain the second interference parameter threshold that is preconfigured; and/or, the resource location determining module is configured to, when the data receiver is within a coverage range of a base station, configure the second interference parameter threshold through downlink signaling of the base station.

According a fifth aspect of the embodiments of the present disclosure, a computer-readable storage medium is provided, which stores one or more programs for executing the method in the first aspect.

According a sixth aspect of the embodiments of the present disclosure, a computer-readable storage medium is provided, which stores one or more programs for executing the method in the second aspect.

According to a seventh aspect of the embodiments of the present disclosure, an electronic device is provided. In a sidelink communication system, UE communicate directly with each other through a sidelink, and the UE include a data transmitter transmitting user data and a data receiver receiving the user data. The electronic device is applied to the data transmitter in the sidelink communication system, and may include: a processor; and memory for storing one or more instructions executable by the processor. The processor is configured to determine a location of a time-frequency resource for response information transmitted by the data receiver of the user data, indicate the location of the time-frequency resource for the transmission of the response information to the data receiver, and receive the response information from the data receiver at the location of the time-frequency resource.

According to an eighth aspect of the embodiments of the present disclosure, an electronic device is provided. In a sidelink communication system, UE communicate directly with each other through a sidelink, and the UE include a data transmitter transmitting user data and a data receiver receiving the user data. The electronic device is applied to the data receiver in the sidelink communication system, and may include: a processor; and memory for storing one or more instructions executable by the processor. The processor is configured to: receive locations of time-frequency resources for the transmission of the response information indicated by the data transmitter, determine at least one selected location of time-frequency resource from the locations of the time-frequency resources for the transmission of the response information indicated by the data transmitter, and after receiving the user data from the data transmitter, transmit the response information to the data transmitter on the at least one selected location of the time-frequency resource.

By adopting the above technical solution, in a sidelink communication system between UE, a location of a feedback transmission resource for the transmission of the response information by a data receiver may be determined by a data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, so as to realize transmission of the response information.

DETAILED DESCRIPTION

Figure 1:
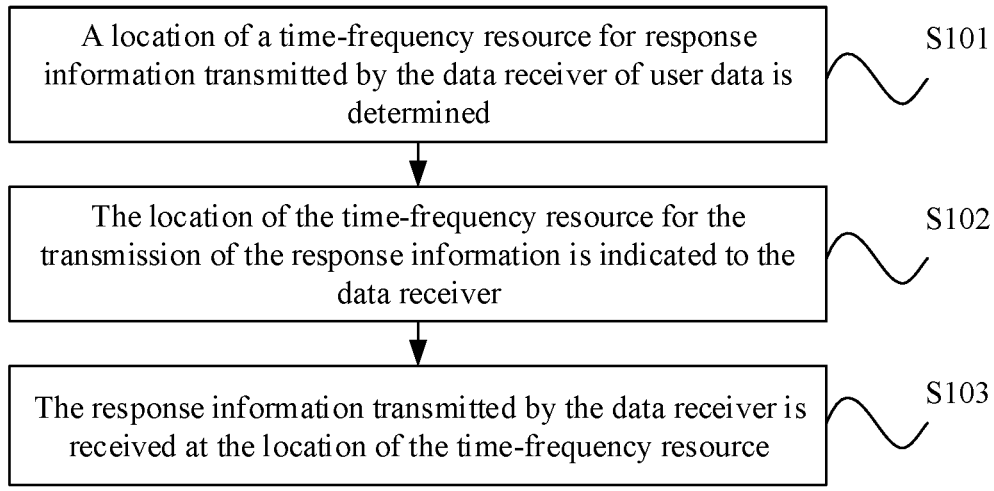
FIG. 1 is a flowchart of a method for transmitting response information according to an embodiment of the present disclosure.

The specific implementations of the present disclosure are elaborated below in combination with the accompanying drawings. It should be understood that the specific implementations described herein are used only to illustrate and explain the present disclosure and are not used to limit the present disclosure.

It is to be noted that "the first", "the second" and other descriptions in the following embodiments of the present disclosure are only used to distinguish similar phenomena, and are not used to describe a particular order or sequence, nor for a specific limit.

First, the application scenarios of the present disclosure are illustrated. The present disclosure may be applied to IoV communication. In the IoV communication, present base station deployment may be effectively utilized through a cellular communication technology to reduce equipment overhead and provide services guaranteed with QoS, thereby meeting the needs of IoV services, for example, IoV communication based on an LTE network and IoV communication based on an NR network. In the technology, the communication between a vehicle terminal and other devices may be transferred through a base station and a core network, that is, uplink and downlink communication may be carried out through a communication link between the terminal device and the base station in a cellular network; or, sidelink communication may also be carried out directly through a sidelink between UE. The sidelink communication has the characteristics such as low latency and less overhead, so it is very suitable for direct communication between a vehicle device and other peripheral devices geographically close to the vehicle device.

In transmission communication of an LTE network and an NR network, for uplink and downlink unicast communication, the integrity and reliability of data transmission may be ensured through a physical layer HARQ mechanism. For example, for NR downlink data transmission, a base station may indicate, through Downlink Control Information (DCI) scheduling downlink data transmission, feedback transmission resources (such as a time slot) reported by HARQ response information corresponding to the downlink data. Each terminal device may feed back response information on the feedback transmission resource. For NR uplink data transmission, HARQ response information of uplink data may be included in subsequent DCI scheduling uplink data. For example, whether the current HARQ is retransmission may be determined based on whether a New Data Indicator (NDI) in the DCI is flipped. If the NDI is flipped, then it means that the uplink data is new uplink data; otherwise, if the NDI is not flipped, then it means that the uplink data is retransmitted uplink data.

For a direct (sidelink) communication system between UE, for example, in IoV direct communication, the UE may communicate with each other directly through a direct link, that is, a data transmitter and a data receiver may directly transmit user data through the direct link, so there is no base station, and transmission of uplink and downlink data and transmission of response information cannot be scheduled through the base station. As a result, transmission of response information cannot be carried out.

Accordingly, the present disclosure provides a method and apparatus for transmitting response information, a storage medium and an electronic device. The method includes that: a location of a time-frequency resource for response information transmitted by the data receiver of user data is determined; the location of the time-frequency resource for the transmission of the response information is indicated to the data receiver; and the response information transmitted by the data receiver is received at the location of the time-frequency resource. In this way, in the direct communication system between UE, the location of the feedback transmission resource for the transmission of the response information by the data receiver during response information transmission may be determined at the data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, thereby realizing transmission of the response information. Moreover, in the present disclosure, the location of the feedback transmission resource may be determined at the data transmitter, and the determined location of the feedback transmission resource may also be notified to other terminal devices through a broadcast message, so as to occupy the resource and reduce a transmitting delay when the response information is transmitted.

The present disclosure is elaborated below in combination with specific embodiments.

FIG. 1 is a method for transmitting response information according to an embodiment of the present disclosure. As shown in FIG. 1, in a direct communication system, UE communicate directly with each other through a direct communication link, and the UE include a data transmitter transmitting user data and a data receiver receiving the user data. The method is applied to the data transmitter in the direct communication system, and includes the following operations.

At S101, a location of a time-frequency resource for response information transmitted by the data receiver of user data is determined.

In this operation, the location of the time-frequency resource for the transmission of the response information may be determined in at least one of the following two manners.

First manner: information transmission of first other UE than the data transmitter is monitored, and the location of the time-frequency resource for the transmission of the response information is determined based on a monitoring result.

In this manner, first control information transmitted by the first other UE is received first, the first control information including indication information indicating a time-frequency resource for the first other UE; and then, based on the first control information, the location of the time-frequency resource for the transmission of the response information is determined from unoccupied time-frequency resources.

Second manner: a signal interference of the first other UE at a target time-frequency resource is measured, and the location of the time-frequency resource for the transmission of the response information is determined based on a measurement result.

The target time-frequency resource may be multiple time-frequency resources allocated by a system, or a resource in a resource pool obtained by dividing the multiple time-frequency resources allocated by the system, or a time-frequency resource having a time-frequency offset from a candidate time-frequency resource for the transmission of the response information by the response information, which is not limited by the present disclosure. The signal interference may be represented by a first interference signal parameter. The first interference signal parameter may include first interference signal intensity and/or first interference signal energy, that is, the greater the first interference signal intensity or the first interference signal energy is, the stronger the signal interference is, and correspondingly, the more likely the time-frequency resource is for the transmission of the response information. In this manner, the first interference signal parameter of the first other UE at the target time-frequency resource may be measured, and a first interference parameter threshold may be obtained, and the location of the time-frequency resource for the transmission of the response information may be determined based on the first interference parameter threshold and the first interference signal parameter.

For obtaining the first interference parameter threshold, a manner is that the preconfigured first interference parameter threshold may be obtained, and another manner is that when the data transmitter is within a coverage range of a base station, the first interference parameter threshold configured by the base station through downlink signaling may be obtained. Of course, when the data transmitter is within the coverage range of the base station, the preconfigured first interference parameter threshold may also be obtained, which is not limited by the present disclosure.

Taking that the first interference signal parameter includes the first interference signal intensity or the first interference signal energy as an example, the determination of the location of the time-frequency resource for the transmission of the response information is illustrated below.

When the first interference signal parameter includes the first interference signal intensity, the first interference parameter threshold includes the first interference strength threshold, the data transmitter may measure the first control information transmitted by the first other UE and/or the first reference signal intensity at the time-frequency resource for the user data, estimate a first interference signal intensity at a subsequent time-frequency resource for the first other UE based on the measured first reference signal intensity, and determine the location of the time-frequency resource for the transmission of the response information from locations of time-frequency resources at which the first interference signal intensity is less than or equal to the first interference strength threshold.

When the first interference signal intensity is estimated based on the measured first reference signal intensity, the data transmitter may measure multiple first reference signal intensities, so in the embodiment, the last measured first reference signal intensity may be taken as the first interference signal intensity.

When the first interference signal parameter includes the first interference signal energy, the first interference parameter threshold includes a first interference energy threshold and/or a first ratio, the first ratio including a first percentage or a first quantity. The data transmitter may measure first received signal energy at the target time-frequency resource, and estimate, based on the measured first received signal energy, first interference signal energy at a first offset time-frequency resource with a time-frequency offset from the target time-frequency resource. After the first interference signal energy is obtained and when the first interference parameter threshold includes the first interference energy threshold, the data transmitter may determine the location of the time-frequency resource for the transmission of the response information from locations of time-frequency resources at which the first interference signal energy is less than or equal to the first interference energy threshold; when the first interference parameter threshold includes the first ratio, the data transmitter may determine the location of the time-frequency resource for the transmission of the response information from time-frequency resources with minimum first interference signal energy according to the first percentage or the first quantity.

The time-frequency offset may be preset. For example, a frequency offset may be set to 0, and a time offset may be set to an integer multiple of 100 ms. Moreover, when the first interference signal intensity at the first offset time-frequency resource is estimated based on the measured first received signal energy, the data transmitter may calculate the average value of the measured first received signal energy and take the average value as the first interference signal intensity.

At S102, the location of the time-frequency resource for the transmission of the response information is indicated to the data receiver.

The location of the time-frequency resource for the transmission of the response information may be included indicated in data scheduling information indicating a location of a time-frequency resource of data transmission corresponding to the response information.

In this operation, the location of the time-frequency resource for the transmission of the response information may be indicated in any one of the following two manners.

First manner: a relative distance between the location of the time-frequency resource for the transmission of the response information and the location of the time-frequency resource for the user data corresponding to the response information is indicated.

Exemplarily, the relative distance may be a starting distance between the starting location of the time-frequency resource for the transmission of the response information and the starting location of the time-frequency resource for the user data corresponding to the response information. The relative distance may also be an end distance between the end location of the time-frequency resource for the transmission of the response information and the end location of the time-frequency resource for the user data corresponding to the response information. In this way, after receiving the location of the time-frequency resource for the transmission of the response information indicated by the data transmitter, the data receiver may determine the location of the time-frequency resource for the transmission of the response information based on the starting distance or the end distance.

Second manner: a resource pool cycle of the time-frequency resource in a resource pool to which the time-frequency resource belongs, and the location of the time-frequency resource in the resource pool cycle are indicated.

The resource pool may include a resource pool obtained by dividing the time-frequency resources configured by the system according to a preset cycle. It is to be noted that the division of the transmission resource pool may refer to the division of the resource pool in the prior art and will not be repeated here.

At S103, the response information transmitted by the data receiver is received at the location of the time-frequency resource.

There is at least one location of time-frequency resource for the transmission of the response information. In this operation, the data transmitter attempts o receive the response information from the data receiver on a location of each time-frequency resource for the transmission of the response information.

Based on the above method, in a direct communication system between UE, a location of a feedback transmission resource for the transmission of the response information by the data receiver may be determined at the data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, so as to realize the transmission of the response information.

Figure 2:
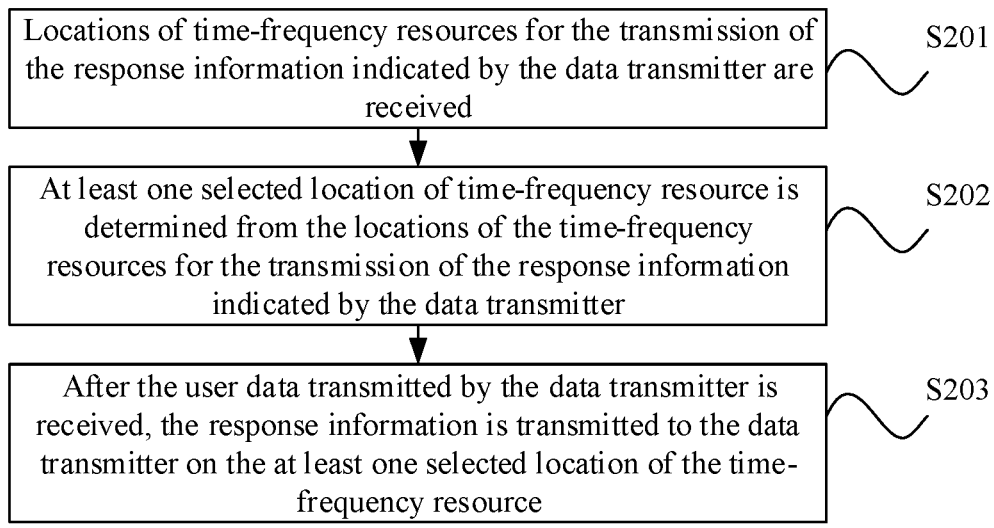
FIG. 2 is a flowchart of another method for transmitting response information according to an embodiment of the present disclosure.

FIG. 2 is a method for transmitting response information according to an embodiment of the present disclosure. As shown in FIG. 2, in a direct communication system, UE communicate directly with each other through a direct communication link, and the UE include a data transmitter transmitting user data and a data receiver receiving the user data. The method is applied to the data receiver in the direct communication system, and includes the following operations.

At S201, locations of time-frequency resources for the transmission of the response information indicated by the data transmitter are received.

The location of the time-frequency resource for the transmission of the response information may be the relative distance to the location of the time-frequency resource for the user data corresponding to the response information.

For example, the relative distance may be the starting distance between the starting location of the time-frequency resource for the transmission of the response information and the starting location of the time-frequency resource for the user data corresponding to the response information, thus after receiving the location of the time-frequency resource for the transmission of the response information indicated by the data transmitter, the data receiver may determine the starting location of the time-frequency resource for the transmission of the response information based on the starting distance, so as to determine the location of the time-frequency resource for the transmission of the response information. The relative distance may also be the end distance between the end location of the time-frequency resource for the transmission of the response information and the end location of the time-frequency resource for the user data corresponding to the response information, thus after receiving the location of the time-frequency resource for the transmission of the response information indicated by the data transmitter, the data receiver may determine the end location of the time-frequency resource for the transmission of the response information according to the end distance, so as to determine the location of the time-frequency resource for the transmission of the response information.

The location of the time-frequency resource for the transmission of the response information may also be a resource pool cycle of the time-frequency resource in the resource pool to which the time-frequency resource belongs, and the location of the time-frequency resource in the resource pool cycle. In this way, the data receiver may determine the location of the time-frequency resource for the transmission of the response information according to the resource pool cycle and the location of the time-frequency resource in the resource pool cycle.

The resource pool may include a resource pool obtained by dividing the time-frequency resources to be selected according to a preset cycle. It is to be noted that the division of the resource pool may refer to the division of the resource pool in the prior art and will not be repeated here.

At S202, at least one selected location of time-frequency resource is determined from the locations of the time-frequency resources for the transmission of the response information indicated by the data transmitter.

In a possible implementation, a location of each time-frequency resource for the transmission of the response information may be determine as the at least one selected location of the time-frequency resource.

This manner is to determine all the locations indicated by the transmitter as the at least one selected location of the time-frequency resource.

In another possible implementation, at least one location of the time-frequency resource for the transmission of the response information may be determined in at least one of the following two manners.

First manner: information transmission of second other UE than the data receiver is monitored, and the at least one selected location of the time-frequency resource is determined based on the monitoring result.

In the first manner, second control information transmitted by the second other UE may be received, and unoccupied time-frequency resources may be determined from the time-frequency resources for the transmission of the response information based on the second control information, and the at least one selected location of the time-frequency resource may be determined from unoccupied time-frequency resources, the second control information including indication information indicating a time-frequency resource for the second other UE.

Second manner: a signal interference of the second other UE on the locations of the time-frequency resources for the transmission of the response information is measured, and the at least one selected location of the time-frequency resource is determined based on a measurement result.

The signal interference may be represented by a second interference signal parameter, and the second interference signal parameter may include second interference signal intensity and/or second interference signal energy, that is, the greater the second interference signal intensity or the second interference signal energy is, the stronger the signal interference is, and correspondingly, the more likely the time-frequency resource is for the transmission of the response information. In this manner, the second interference signal parameter of the second other UE on the locations of the time-frequency resources for the transmission of the response information may be measured, a second interference parameter threshold may be obtained, and the at least one selected location of the time-frequency resource may be determined based on the second interference parameter threshold and the second interference signal parameter.

For obtaining the second interference parameter threshold, a manner is that the preconfigured second interference parameter threshold may be obtained, and another manner is that when the data transmitter is within a coverage range of a base station, the second interference parameter threshold configured by the base station through the downlink signaling may be obtained. Of course, when the data transmitter is within the coverage range of the base station, the preconfigured second interference parameter threshold may also be obtained, which is not limited by the present disclosure.

Taking that the second interference signal parameter includes the second interference signal intensity or the second interference signal energy as an example, the determination of the location of the time-frequency resource for the transmission of the response information is illustrated below.

When the second interference signal parameter includes the second interference signal intensity, the second interference parameter threshold includes the second interference strength threshold, the data receiver may measure second reference signal intensity at a time-frequency resource for user data and/or second control information transmitted by the second other UE, estimate a second interference signal intensity at a subsequent time-frequency resource for the second other UE based on the measured second reference signal intensity, and determine the at least one selected location of the time-frequency resource from locations of time-frequency resources at which the second interference signal intensity is less than or equal to the second interference strength threshold.

When the second interference signal intensity is estimated based on the measured second reference signal intensity, the data receiver may measure multiple second reference signal intensities, so in the embodiment, the last measured second reference signal intensity may be taken as the second interference signal intensity.

When the second interference signal parameter includes the second interference signal energy, the second interference parameter threshold includes a second interference energy threshold and/or a second ratio, and the second ratio including a second percentage or a second quantity, the data receiver may measure second received signal energy at the location of the time-frequency resource for the transmission of the response information, and estimate, based on the second received signal energy, the second interference signal energy at a second offset time-frequency resource with a time-frequency offset from the location of the time-frequency resources for the transmission of the response information. After the second interference signal energy is obtained, when the second interference parameter threshold includes the second interference energy threshold, the data receiver may determine the at least one selected location of the time-frequency resource from locations of time-frequency resources at which the second interference signal energy is less than or equal to the second interference energy threshold.

When the second interference parameter threshold includes the second ratio, the data receiver may determine the at least one selected location of the time-frequency resource from the locations of time-frequency resources with minimum second interference signal energy according to the second percentage or the second quantity.

At 203, after the user data transmitted by the data transmitter is received, the response information is transmitted to the data transmitter on the at least one selected location of the time-frequency resource.

It is to be noted that the data transmitter may also indicate the transmission power that the data receiver transmits the response information while indicating the time-frequency resource for the transmission of the response information, then in this operation, the data receiver may receive the transmission power indicated by the data transmitter, and transmit the response information to the data transmitter based on the transmission power on the at least one selected location of the time-frequency resource.

Based on the above method, in a direct communication system between UE, a location of a feedback transmission resource for the transmission of the response information by the data receiver may be determined by the data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, thereby realizing the transmission of the response information.

Figure 3:
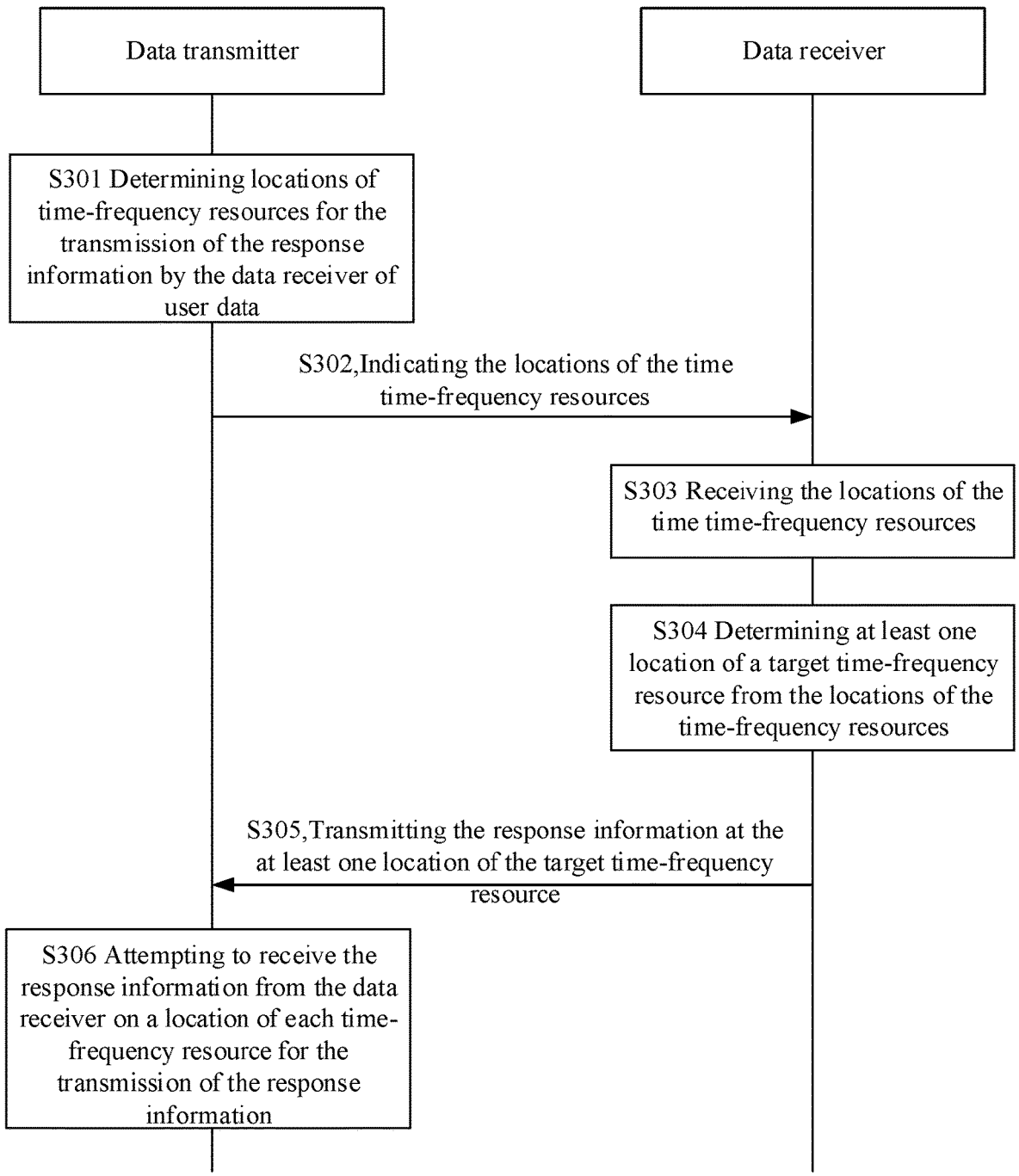
FIG. 3 is a flowchart of yet another method for transmitting response information according to an embodiment of the present disclosure.

FIG. 3 is a method for transmitting response information according to an embodiment of the present disclosure. As shown in FIG. 3, in a direct communication system, UE communicate directly with each other through a direct communication link, and the UE include a data transmitter transmitting user data and a data receiver receiving the user data. The method includes the following operations.

At S301, the data transmitter determines locations of time-frequency resources for the transmission of the response information by the data receiver of user data.

In this operation, a location of a time-frequency resource for the transmission of the response information may be determined in at least one of the following two manners.

First manner: information transmission of first other UE than the data transmitter is monitored, and the location of the time-frequency resource for the transmission of the response information is determined based on a monitoring result.

In this manner, first control information transmitted by the first other UE is received first, the first control information including indication information indicating a time-frequency resource for response information transmitted by the first other UE; and then, based on the first control information, the location of the time-frequency resource for the transmission of the response information is determined from unoccupied time-frequency resources.

It is to be noted that considering that the unoccupied time-frequency resources may be less, the transmission requirement of response information may not be met, or for multiple adjacent data receivers, the determined unoccupied time-frequency resources may be similar. When the unoccupied time-frequency resources get less, resource collisions may occur when multiple adjacent data receivers transmit the response information simultaneously in the future. Therefore, in order to solve the above problem, in a possible implementation, the data transmitter may determine whether the unoccupied time-frequency resources are sufficient.

Here, it may be determined whether the proportion of the unoccupied time-frequency resources in the target time-frequency resources is greater than or equal to a preset proportion. When the proportion is greater than or equal to the preset proportion, it is determined that the occupied time-frequency resources are sufficient. When the proportion is less than the preset proportion, it is determined that the unoccupied time-frequency resources are insufficient.

The target time-frequency resource may be multiple time-frequency resources allocated by a system, or a resource in a resource pool divided from the multiple time-frequency resources allocated by the system, or a time-frequency resource having a time-frequency offset from a candidate time-frequency resource for the transmission of the response information, which is not limited by the present disclosure.

When it is determined that the unoccupied time-frequency resources are sufficient, the location of the time-frequency resource may be determined from unoccupied time-frequency resources.

When it is determined that the unoccupied time-frequency resources are insufficient, at least one undetermined time-frequency resource with the minimum signal interference may be determined from other time-frequency resources in the target time-frequency resources other than the unoccupied time-frequency resources according to a signal parameter of the other time-frequency resources, and the location of the time-frequency resource for the transmission of the response information may be determined from unoccupied time-frequency resources and the at least one undetermined time-frequency resource.

The signal parameter may be signal intensity and/or signal energy.

Here, at least one undetermined time-frequency resource with the minimum signal interference may be determined by either of the following two possible implementations. One of the possible implementations is to determine other time-frequency resource with a signal parameter less than or equal to the preset parameter threshold as the undetermined time-frequency resource. Another possible implementation is to sort the other time-frequency resources in order of signal parameters from smallest to largest, and determine, according to a sorting result, the undetermined time-frequency resource from the other time-frequency resources with the smallest signal parameters in accordance with a preset parameter proportion. The preset parameter proportion includes a ratio of the number of undetermined time-frequency resources to the number of target time-frequency resources.

Based on the above mode, a time-frequency resource with less interference may be selected from unoccupied time-frequency resources as the time-frequency resource for the transmission of the response information, so as to ensure that the data receiver may transmit response information with a sufficient time-frequency resource, and avoid resource collision when the response information is transmitted at the time-frequency resource.

Second manner: signal interference of the first other UE at the target time-frequency resource is measured, and the location of the time-frequency resource for the transmission of the response information is determined based on a measurement result.

The signal interference may be represented by the first interference signal parameter, and the first interference signal parameter may include the first interference signal intensity and/or the first interference signal energy, that is, the greater the first interference signal intensity or the first interference signal energy is, the stronger the signal interference is, and correspondingly, the more likely the time-frequency resource is occupied. In this manner, the first interference signal parameter of the first other UE at the target time-frequency resource may be measured, and the first interference parameter threshold may be obtained, and the location of the time-frequency resource for the transmission of the response information may be determined based on the first interference parameter threshold and the first interference signal parameter.

For obtaining the first interference parameter threshold, a manner is that the preconfigured first interference parameter threshold may be obtained, and another manner is that when the data transmitter is within a coverage range of a base station, the first interference parameter threshold configured by the base station through downlink signaling may be obtained. Of course, when the data transmitter is within the coverage range of the base station, the preconfigured first interference parameter threshold may also be obtained, which is not limited by the present disclosure.

Taking that the first interference signal parameter includes the first interference signal intensity or the first interference signal energy as an example, the determination of the location of the time-frequency resource for the transmission of the response information is illustrated below.

When the first interference signal parameter includes the first interference signal intensity, the first interference parameter threshold includes the first interference strength threshold, the data transmitter may measure the first control information transmitted by the first other UE and/or the first reference signal intensity at the time-frequency resource for the user data, estimate a first interference signal intensity at a subsequent time-frequency resource for the first other UE based on the measured first reference signal intensity, and determine the location of the time-frequency resource for the transmission of the response information from locations of time-frequency resources at which the first interference signal intensity is less than or equal to the first interference strength threshold.

For example, a preset number of time-frequency resources may be randomly determined, from locations of time-frequency resources at which the first interference signal intensity is less than or equal to the first interference strength threshold, as the location of the time-frequency resource for the transmission of the response information.

When the first interference signal intensity is estimated based on the measured first reference signal intensity, the data transmitter may measure multiple first reference signal intensities, so in the embodiment, the last measured first reference signal intensity may be taken as the first interference signal intensity.

When the first interference signal parameter includes the first interference signal energy, the first interference parameter threshold includes the first interference energy threshold and/or the first ratio, the first ratio including the first percentage or the first quantity. The data transmitter may measure the first received signal energy at the target time-frequency resource, and estimate, based on the measured first received signal energy, the first interference signal energy at the first offset time-frequency resource with a time-frequency offset from the target time-frequency resource. After the first interference signal energy is obtained, when the first interference parameter threshold includes the first interference energy threshold, the data transmitter may determine the location of the time-frequency resource for the transmission of the response information from locations of time-frequency resources at which the first interference signal energy is less than or equal to the first interference energy threshold. For example, a preset number of time-frequency resources may be randomly determined, from locations of time-frequency resources at which the second interference signal intensity is less than or equal to the second interference strength threshold, as the at least one selected location of the time-frequency resource.

When the first interference parameter threshold includes the first ratio, the data transmitter may determine the location of the time-frequency resource for the transmission of the response information from time-frequency resources with minimum first interference signal energy according to the first percentage or the first quantity.

The time-frequency offset may be preset. For example, the frequency offset may be set to 0, and the time offset may be set to an integer multiple of 100 ms. Moreover, when the first interference signal intensity at the first offset time-frequency resource is estimated based on the measured first received signal energy, the data transmitter may calculate the average value of the measured first received signal energy and take the average value as the first interference signal intensity.

It is to be noted that the data receiver needs to process user data (such as verification) after receiving the user data from the data transmitter, therefore, in order to ensure that the data receiver completes processing of the user data before transmitting the response information, a time difference between a starting resource unit of the time-frequency resource for the transmission of the response information and an ending resource unit of the time-frequency resource for the user data corresponding to the response information is greater than or equal to a preset time difference threshold. The preset time difference threshold may be preset based on a latency of processing the user data by the data receiver, so as to prevent the data receiver from transmitting the response information to the data transmitter before completing the processing of the user data.

Moreover, in order to ensure that the data transmitter can successfully receive the response information from the data receiver, the data transmitter may also determine the transmission power that the data receiver transmits the response information and indicate the transmission power to the data receiver.

In a possible implementation, the transmission power may be determined based on the signal parameter at the time-frequency resource for the transmission of the response information. The signal parameter may be the target interference signal intensity of the first other UE at the time-frequency resource for the transmission of the response information, and/or the target interference signal energy at the time-frequency resource for the transmission of the response information. Thus, in this embodiment, the target interference signal intensity of the first other UE at the time-frequency resource for the transmission of the response information may be obtained, and the transmission power may be determined based on the target interference signal intensity; and/or, the target interference signal energy at the time-frequency resource for the transmission of the response information may be obtained, and the transmission power may be determined based on the target interference signal energy.

Exemplarily, the higher the value of the signal parameter is, the higher the determined transmission power is determined. Conversely, the lower the value of the signal parameter is, the lower the determined transmission power is. For example, a corresponding relationship between multiple signal parameter ranges and the transmission power may be preset. After the signal parameter is obtained, the signal parameter range where the signal parameter is located may be determined, and the transmission power corresponding to the signal parameter range may be determined. For another example, a default transmission power may be set, the signal parameter corresponding to the default transmission power is P, and a corresponding relationship between a parameter difference range and a transmission power difference is preset. After the signal parameter at the time-frequency resource for the transmission of the response information is obtained, when it is determined that the signal parameter at the time-frequency resource for the transmission of the response information is greater than P and it is determined that the parameter difference range where the difference between the signal parameter and the signal parameter P is located is range A, a transmission power difference corresponding to the range A may be determined according to the corresponding relationship between the parameter difference range and the transmission power difference, and the default transmission power may be increased based on the transmission power difference. When it is determined that the signal parameter at the time-frequency resource for the transmission of the response information is less than P and it is determined that the parameter difference range where the difference between the signal parameter and the signal parameter P is located is range B, a transmission power difference corresponding to the range B may be determined according to the corresponding relationship between the parameter difference range and the transmission power difference, and the default transmission power may be reduced based on the transmission power difference. Of course, the above method for determining the transmission power is only an example and is not limited by the present disclosure.

After the transmission power is determined, the transmission power may be indicated while the location of the time-frequency resource for the transmission of the response information is indicated to the data receiver later.

At S302, the data transmitter indicates the locations of the time-frequency resources for the transmission of the response information to the data receiver.

The location of the time-frequency resource for the transmission of the response information may be included indicated in data scheduling information indicating a location of a time-frequency resource of data transmission corresponding to the response information.

In this operation, the location of the time-frequency resource for the transmission of the response information may be indicated in any one of the following two manners.

First manner: a relative distance between the location of the time-frequency resource for the transmission of the response information and the location of the time-frequency resource for the user data corresponding to the response information may be indicated.

Exemplarily, the relative distance may be a starting distance between the initial location of the time-frequency resource for the transmission of the response information and the initial location of the time-frequency resource for the user data corresponding to the response information. The relative distance may also be an end distance between the end location of the time-frequency resource for the transmission of the response information and the end location of the time-frequency resource for the user data corresponding to the response information. In this way, after receiving the location of the time-frequency resource for the transmission of the response information indicated by the data transmitter, the data receiver may determine the location of the time-frequency resource for the transmission of the response information based on the starting distance or the end distance.

It is to be noted that when data scheduling information indicates multiple data transmissions, the relative distance may be a location space between the time-frequency resource for the transmission of the response information and a time-frequency resource for latest user data in latest transmission.

Moreover, when the multiple data transmissions include repeated transmission of the user data on multiple time-frequency resources, the data receiver may be indicated of the location of the time-frequency resource for the transmission of the response information corresponding to each user data; or, the same user data may be merged, and the data receiver may be indicated of a location of a time-frequency resource for the transmission of the response information corresponding to the merged user data.

Second manner: a resource pool cycle of the time-frequency resource in a resource pool to which the time-frequency resource belongs and a location of the time-frequency resource in the resource pool cycle are indicated.

The resource pool may include a resource pool obtained by dividing the time-frequency resources configured by the system according to the preset cycle. It is to be noted that the division of the transmission resource pool may refer to the division of the resource pool in the prior art and will not be repeated here.

Moreover, when the location of the time-frequency resource for the transmission of the response information is indicated, the relative time location may be fixed and only the relative frequency location is indicated; or the relative frequency location may be fixed and only the relative time location is indicated. In this way, the communication resource can be saved by reducing signaling bits for the transmission of the response information when the location of the time-frequency resource for the transmission of the response information is indicated.

At S303, the data receiver receives the locations of the time-frequency resources for the transmission of the response information indicated by the data receiver.

The location of the time-frequency resource for the transmission of the response information may be the relative distance to the location of the time-frequency resource for the user data corresponding to the response information.

For example, the relative distance may be the starting distance between the starting location of the time-frequency resource for the transmission of the response information and the starting location of the time-frequency resource for the user data corresponding to the response information, thus after receiving the location of the time-frequency resource for the transmission of the response information from the data transmitter, the data receiver may determine the starting location of the time-frequency resource for the transmission of the response information based on the starting distance, so as to determine the location of the time-frequency resource for the transmission of the response information. The relative distance may also be the end distance between the end location of the time-frequency resource for the transmission of the response information and the end location of the time-frequency resource for the user data corresponding to the response information, thus after receiving the location of the time-frequency resource for the transmission of the response information from the data transmitter, the data receiver may determine the end location of the time-frequency resource for the transmission of the response information according to the end distance, so as to determine the location of the time-frequency resource for the transmission of the response information.

The location of the time-frequency resource for the transmission of the response information may also be a resource pool cycle of the time-frequency resource in a resource pool to which the time-frequency resource belongs and a location of the time-frequency resource in the resource pool cycle. In this way, the data receiver may determine the location of the time-frequency resource for the transmission of the response information based on the resource pool cycle and the location of the time-frequency resource in the resource pool cycle.

At S304, the data receiver determines at least one location of a target time-frequency resource from locations of time-frequency resources for the transmission of the response information indicated by the data transmitter.

In a possible implementation, a location of each time-frequency resource for the transmission of the response information may be determine as the at least one selected location of the time-frequency resource.

This manner is to determine all the locations indicated by the transmitter as the at least one selected location of the time-frequency resource.

In another possible implementation, at least one selected location of the time-frequency resource may be determined in at least one of the following two manners.

First manner: the information transmission of second other UE than the data receiver is monitored, and the at least one selected location of the time-frequency resource is determined based on the monitoring result.

In the first manner, second control information transmitted by the second other UE may be received, and unoccupied time-frequency resources may be determined from the time-frequency resources for the transmission of the response information based on the second control information, and the at least one selected location of the time-frequency resource may be determined from unoccupied time-frequency resources, the second control information including indication information indicating a time-frequency resource for the second other UE.

Second manner: a signal interference of the second other UE on the locations of the time-frequency resources for the transmission of the response information is measured, and the at least one selected location of the time-frequency resource is determined based on a measurement result.

The signal interference may be represented by a second interference signal parameter, and the second interference signal parameter may include second interference signal intensity and/or second interference signal energy, that is, the greater the second interference signal intensity or the second interference signal energy is, the stronger the signal interference is, and correspondingly, the more likely the time-frequency resource is occupied. In this manner, the second interference signal parameter of the second other UE on the locations of the time-frequency resources for the transmission of the response information may be measured, a second interference parameter threshold may be obtained, and the at least one selected location of the time-frequency resource may be determined based on the second interference parameter threshold and the second interference signal parameter.

For obtaining the second interference parameter threshold, a manner is that the preconfigured second interference parameter threshold may be obtained, and another manner is that when the data transmitter is within a coverage range of a base station, the second interference parameter threshold configured by the base station through the downlink signaling may be obtained. Of course, when the data transmitter is within the coverage range of the base station, the preconfigured second interference parameter threshold may also be obtained, which is not limited by the present disclosure.

Taking that the second interference signal parameter includes the second interference signal intensity or the second interference signal energy as an example, the determination of the location of the time-frequency resource for the transmission of the response information is illustrated below.

When the second interference signal parameter includes the second interference signal intensity, the second interference parameter threshold includes the second interference strength threshold, the data receiver may measure second reference signal intensity at a time-frequency resource for user data and/or second control information transmitted by the second other UE, estimate a second interference signal intensity at a subsequent time-frequency resource for the second other UE based on the measured second reference signal intensity, and determine the at least one selected location of the time-frequency resource from locations of time-frequency resources at which the second interference signal intensity is less than or equal to the second interference strength threshold.

For example, a preset number of time-frequency resources may be randomly determined, from locations of time-frequency resources at which the second interference signal intensity is less than or equal to the second interference strength threshold, as the at least one selected location of the time-frequency resource.

When the second interference signal intensity is estimated based on the measured second reference signal intensity, the data receiver may measure multiple second reference signal intensities, so in the embodiment, the last measured second reference signal intensity may be taken as the second interference signal intensity.

When the second interference signal parameter includes the second interference signal energy, the second interference parameter threshold includes the second interference energy threshold and/or the second ratio, the second ratio including the second percentage or the second quantity. The data receiver may measure the second received signal energy at the location of the time-frequency resource for the transmission of the response information, and estimate, based on the second received signal energy, the second interference signal energy at a second offset time-frequency resource with a time-frequency offset from the time-frequency resources for the transmission of the response information. After the second interference signal energy is obtained, when the second interference parameter threshold includes the second interference energy threshold, then the data receiver may determine at least one selected location of the time-frequency resource from locations of time-frequency resources at which the second interference signal energy is less than or equal to the second interference energy threshold. For example, a preset number of time-frequency resources may be randomly determined from locations of time-frequency resources at which the second interference signal intensity is less than or equal to the second interference strength threshold, as the at least one selected location of the time-frequency resource.

When the second interference parameter threshold includes the second ratio, then the data receiver may determine the at least one selected location of the time-frequency resource from the locations of time-frequency resources with minimum second interference signal energy according to the second percentage or the second quantity.

At 305, after the data receiver receives the user data from the data transmitter, the response information is transmitted to the data transmitter at the at least one location of the target time-frequency resource.

It is to be noted that the data transmitter may also indicate the transmission power that the data receiver transmits the response information while indicating the time-frequency resource for the transmission of the response information, then in this operation, the data receiver may receive the transmission power indicated by the data transmitter, and transmit the response information to the data transmitter based on the transmission power on the at least one selected location of the time-frequency resource.

At S306, the data transmitter attempts to receive the response information from the data receiver on a location of each time-frequency resource for the transmission of the response information.

There is at least one location of the time-frequency resource for the transmission of the response information. In this operation, the data transmitter may attempt to receive the response information from the data receiver on a location of each time-frequency resource for the transmission of the response information.

Based on the above method, in a direct communication system between UE, a location of a feedback transmission resource for the transmission of the response information by the data receiver may be determined by the data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, so as to realize the transmission of the response information. Moreover, in the present disclosure, the location of the feedback transmission resource may be determined by the data transmitter, and the determined location of the feedback transmission resource may also be notified to other terminal devices through a broadcast message, so as to occupy the resource and reduce a transmitting delay when the response information is transmitted.

Figure 4:
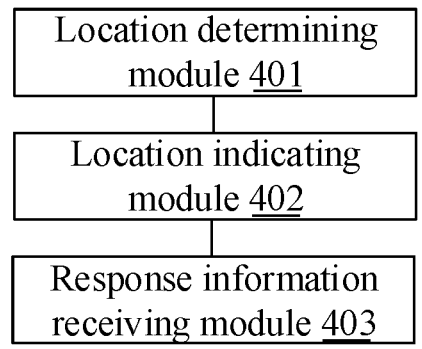
FIG. 4 is a structure diagram of an apparatus for transmitting response information according to an embodiment of the present disclosure.

FIG. 4 is an apparatus for transmitting response information according to an embodiment of the present disclosure. As shown in FIG. 4, in a direct communication system, UE communicate directly with each other through a direct communication link, and the UE include a data transmitter transmitting user data and a data receiver receiving the user data. The apparatus is applied to the data transmitter in the direct communication system, and includes:

a location determining module 401, configured to determine a location of a time-frequency resource for response information transmitted by the data receiver of the user data;

a location indicating module 402, configured to indicate the location of the time-frequency resource for the transmission of the response information to the data receiver; and a response information receiving module 403, configured to receive the response information from the data receiver at the location of the time-frequency resource.

Optionally, the location determining module 401 is configured to monitor information transmission of first other UE than the data transmitter, and determine the location of the time-frequency resource for the transmission of the response information based on the monitoring result; and/or, the location determining module is configured to measure a signal interference of the first other UE at a target time-frequency resource, and determine the location of the time-frequency resource for the transmission of the response information based on a measurement result.

Optionally, the location determining module 401 is configured to receive first control information from the first other UE, and determine the location of the time-frequency resource for the transmission of the response information from unoccupied time-frequency resources based on the first control information, the first control information comprising indication information indicating a time-frequency resource for response information transmitted by the first other UE.

Optionally, the location determining module 401 is configured to measure a first interference signal parameter of the first other UE at the target time-frequency resource, obtain a first interference parameter threshold, and determine the location of the time-frequency resource for the transmission of the response information based on the first interference parameter threshold and the first interference signal parameter, the first interference signal parameter comprising first interference signal intensity and/or first interference signal energy.

Optionally, the location determining module 401 is configured to measure first reference signal intensity at a time-frequency resource for user data and/or first control information transmitted by the first other UE, and estimate a first interference signal intensity at a subsequent time-frequency resource for the first other UE based on the measured first reference signal intensity.

Optionally, the first interference parameter threshold may include a first interference strength threshold. The location determining module 401 is configured to determine the location of the time-frequency resource for the transmission of the response information from locations of time-frequency resources at which the first interference signal intensity is less than or equal to the first interference strength threshold.

Optionally, when the first interference signal parameter includes the first interference signal energy, the location determining module 401 is configured to measure the first received signal energy at the location of the target time-frequency resource, and estimate, based on the measured first received signal energy, the first interference signal energy at a first offset time-frequency resource with a time-frequency offset from the target time-frequency resource.

Optionally, the first interference parameter threshold includes the first interference energy threshold and/or the first ratio, the first ratio including the first percentage or the first quantity. The location determining module 401 is configured to, when the first interference parameter threshold includes the first interference energy threshold, determine the location of the time-frequency resource for the transmission of the response information from locations of time-frequency resources at which the first interference signal energy is less than or equal to the first interference energy threshold; or when the first interference parameter threshold includes the first ratio, determine the location of the time-frequency resource for the transmission of the response information from time-frequency resources with minimum first interference signal energy according to the first percentage or the first quantity.

Optionally, the location determining module 401 is configured to obtain the preconfigured first interference parameter threshold; and/or, the location determining module is configured to, when the data transmitter is within a coverage range of a base station, obtain the first interference parameter threshold configured by the base station through downlink signaling.

Figure 5:
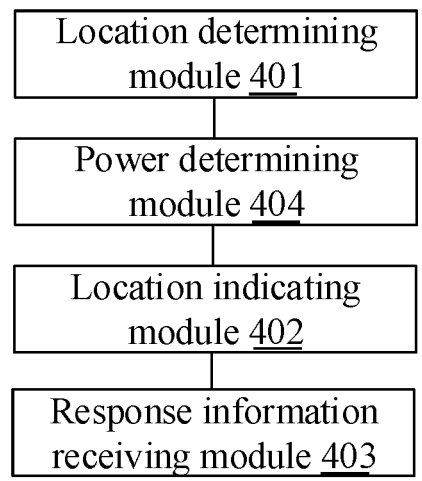
FIG. 5 is a structure diagram of another apparatus for transmitting response information according to an embodiment of the present disclosure.

Optionally, as shown in FIG. 5, the apparatus may further include: a power determining module 404, configured to determine transmission power of the data receiver for transmitting the response information, and indicate the transmission power to the data receiver.

Optionally, the power determining module 404 is configured to obtain a target interference signal intensity of the first other UE at the time-frequency resource for the transmission of the response information, and determine the transmission power based on the target interference signal intensity; and/or, the power determining module is configured to obtain the target interference signal energy at the time-frequency resource for the transmission of the response information, and determine the transmission power based on the target interference signal energy.

Optionally, the location indicating module 402 is configured to indicate a relative distance between the location of the time-frequency resource for the transmission of the response information and the location of the time-frequency resource for the user data corresponding to the response information; or, the location indicating module is configured to indicate a resource pool cycle of the time-frequency resource in the resource pool to which the time-frequency resource belongs, and indicate the location of the time-frequency resource in the resource pool cycle, the resource pool including a resource pool obtained by dividing the time-frequency resources configured by the system according to the preset cycle.

Optionally, the relative distance between the location of the time-frequency resource and the location of the time-frequency resource for the user data corresponding to the response information may include: a location space between the time-frequency resource for the transmission of the response information and a time-frequency resource for latest user data in latest transmission.

Optionally, when the multiple data transmissions include repeated transmission of the user data on multiple time-frequency resources, the location indicating module 402 is configured to indicating a location of a time-frequency resource for transmission of each response information corresponding to each user data to the data receiver; or, the location indicating module is configured to merge the same user data and indicate a time-frequency resource for the transmission of the response information corresponding to the merged user data to the data receiver.

Optionally, the location indicating module 402 is configured to include the location of the time-frequency resource for the transmission of the response information into data scheduling information indicating a location of a time-frequency resource of data transmission corresponding to the response information.

Optionally, a time difference between a starting resource unit of the time-frequency resource for the transmission of the response information and an ending resource unit of the time-frequency resource for the user data corresponding to the response information is greater than or equal to the preset time difference threshold.

Optionally, the response information receiving module 403 is configured to attempt to receive the response information from the data receiver on a location of each time-frequency resource for the transmission of the response information.

Based on the above device, in a direct communication system between UE, a location of a feedback transmission resource for the transmission of the response information by a data receiver may be determined by a data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, so as to realize the transmission of the response information.

Figure 6:
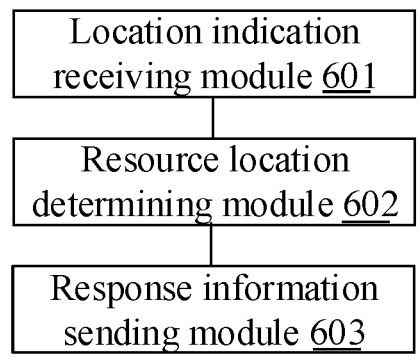
FIG. 6 is a structure diagram of a third apparatus for transmitting response information according to an embodiment of the present disclosure.

FIG. 6 is an apparatus for transmitting response information according to an embodiment of the present disclosure. As shown in FIG. 6, in a direct communication system, UE communicate directly with each other through a direct communication link, and the UE include a data transmitter transmitting user data and a data receiver receiving the user data. The apparatus is applied to the data receiver in the direct communication system, and includes:

a location indication receiving module 601, configured to receive locations of time-frequency resources for the transmission of the response information indicated by the data transmitter;

a resource location determining module 602, configured to determine at least one selected location of time-frequency resource from the locations of the time-frequency resources for the transmission of the response information indicated by the data transmitter; and a response information transmitting module 603, configured to, after receiving the user data from the data transmitter, transmit the response information to the data transmitter on the at least one selected location of the time-frequency resource.

Figure 7:
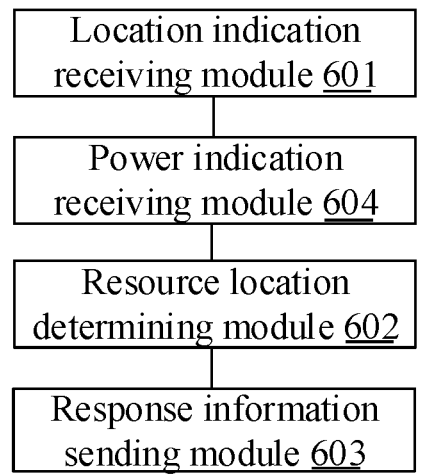
FIG. 7 is a structure diagram of a fourth apparatus for transmitting response information according to an embodiment of the present disclosure.

Optionally, as shown in FIG. 7, the apparatus further may include:

a power indication receiving module 604, configured to receive the transmission power indicated by the data transmitter; and a response information transmitting module 604, configured to transmit the response information to the data transmitter based on the transmission power on the at least one selected location of the time-frequency resource.

Optionally, the resource location determining module 602 is configured to determine a location of each time-frequency resource for the transmission of the response information as the at least one selected location of the time-frequency resource.

Optionally, the resource location determining module 602 is configured to monitor the information transmission of second other UE than the data receiver, and determine the at least one selected location of time-frequency resource based on a monitoring result; and/or, the resource location determining module is configured to measure the signal interference of the second other UE on the locations of the time-frequency resources for the transmission of the response information, and determine at least one selected location of the time-frequency resource based on a measurement result.

Optionally, the resource location determining module 602 is configured to receive the second control information from the second other UE, determine the unoccupied time-frequency resources from the time-frequency resources for the transmission of the response information, based on the second control information, and determine the at least one selected location of the time-frequency resource from unoccupied time-frequency resources, the second control information including the indication information indicating a time-frequency resource for the second other UE.

Optionally, the resource location determining module 602 is configured to measure a second interference signal parameter of the second other UE on the locations of the time-frequency resources for the transmission of the response information, obtain a second interference parameter threshold, and determine the at least one selected location of the time-frequency resource based on the second interference parameter threshold and the second interference signal parameter, the second interference signal parameter including the second interference signal intensity and/or the second interference signal energy.

Optionally, when the second interference signal parameter includes the second interference signal intensity, the resource location determining module 602 is configured to measure second reference signal intensity at a time-frequency resource for user data and/or second control information transmitted by the second other UE, and estimate a second interference signal intensity at a subsequent time-frequency resource for the second other UE based on the measured second reference signal intensity.

Optionally, the second interference parameter threshold includes a second interference strength threshold. The resource location determining module 602 is configured to determine the at least one selected location of the time-frequency resource from locations of time-frequency resources at which the second interference signal intensity is less than or equal to the second interference strength threshold.

Optionally, when the second interference signal parameter includes the second interference signal energy, the resource location determining module 602 is configured to measure the second received signal energy on the locations of the time-frequency resources for the transmission of the response information, and estimate, based on the second received signal energy, second interference signal energy at a second offset time-frequency resource with a time-frequency offset from the time-frequency resource for the transmission of the response information.

Optionally, the second interference parameter threshold may include a second interference energy threshold and/or a second ratio, the second ratio including a second percentage or a second quantity. The resource location determining module 602 is configured to, when the second interference parameter threshold includes the second interference energy threshold, determine the at least one selected location of the time-frequency resource from locations of time-frequency resources at which the second interference signal energy is less than or equal to the second interference energy threshold; or when the second interference parameter threshold includes the second ratio, determine the at least one selected location of the time-frequency resource from time-frequency resources with minimum second interference signal energy according to the second percentage or the second quantity.

Optionally, the resource location determining module 602 is configured to obtain the preconfigured second interference parameter threshold; and/or, the resource location determining module is configured to, when the data receiver is within a coverage range of a base station, configure the second interference parameter threshold through downlink signaling of the base station.

Based on the above device, in a direct communication system between UE, a location of a feedback transmission resource for the transmission of the response information by a data receiver may be determined by a data transmitter, and the location of the feedback transmission resource for the transmission of the response information may be indicated to the data receiver, so that the data receiver, after receiving the user data from the data transmitter, may transmit the response information to the data transmitter at the location of the time-frequency resource indicated by the data transmitter, so as to complete the transmission of the response information.

Figure 8:
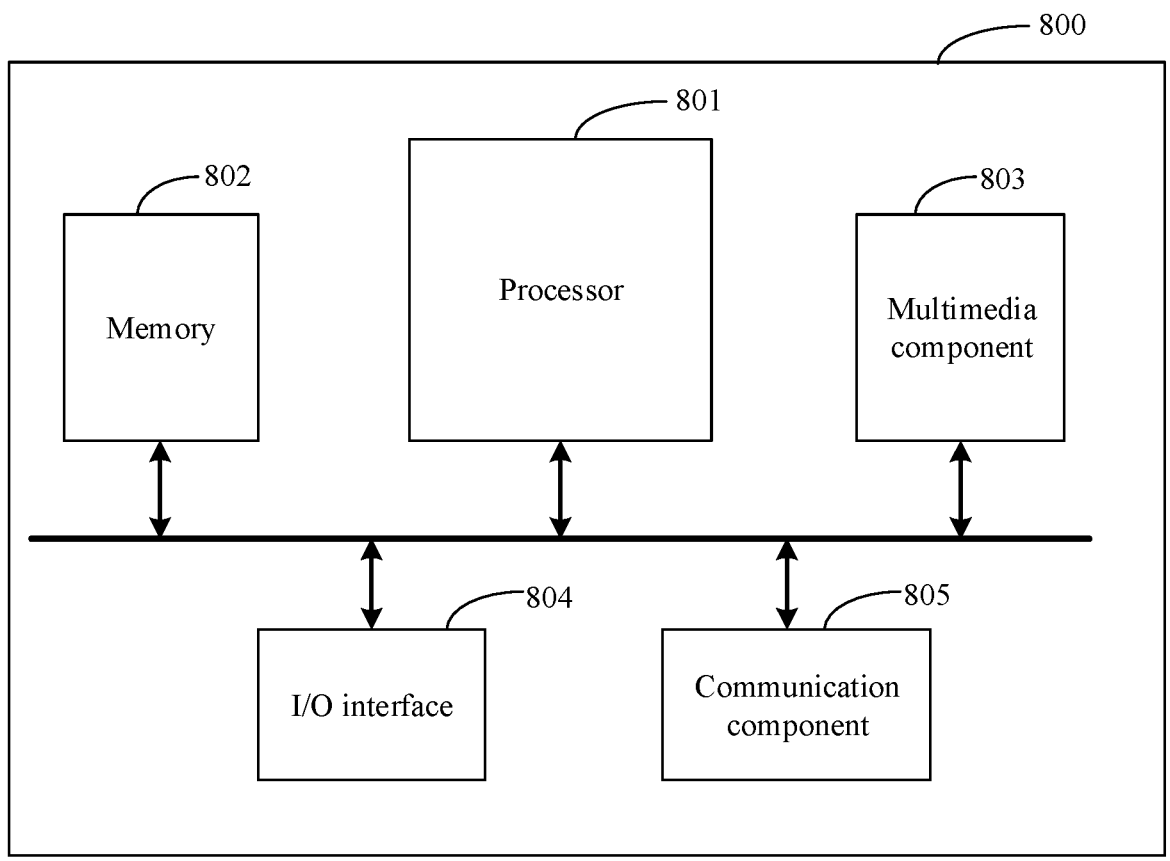
FIG. 8 is a structure diagram of an electronic device according to an embodiment of the present disclosure.

Those skilled in the art may clearly learn about that specific working process and description of the apparatuses described above may refer to the corresponding processes in the method embodiments and will not be elaborated herein for convenient and brief description FIG. 8 is a block diagram of an electronic device according to an embodiment of the present disclosure. As shown in FIG. 8, the electronic device 800 may be a data transmitter or a data receiver, and includes: a processor 801, memory 802, a multimedia component 803, an Input/Output (I/O) interface 804, and a communication component 805.

The processor 801 is configured to control the overall operation of the electronic device 800 to complete all or some of the operations of the above method for transmitting response information. The memory 802 is configured to store various types of data to support the operation of the electronic device 800. Examples of such data may include instructions for any application programs or methods operated on the electronic device 800, and data related to the application programs, such as contact data, messages transmitted and received, images, audio and video.

The memory 802 may be implemented by any type of volatile or non-volatile memory terminal devices, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk. The multimedia component 803 may include a screen and an audio component. The screen may be a touch screen, for example, and the audio component is used for output and/or input of an audio signal. For example, the audio component may include a Microphone (MIC), and the MIC is configured to receive an external audio signal. The received audio signal may further be stored in the memory 802 or transmitted through the communication component 805. The audio component further may include at least one speaker configured to output the audio signal. The I/O interface 804 provides an interface between the processor 801 and other interface modules. The other interface modules may be a keyboard, a mouse, buttons, etc. These buttons may be virtual or physical. The communication component 805 is configured to facilitate wired or wireless communication between the electronic device 800 and another terminal device. The wireless communication is, for example, Wireless Fidelity (WiFi) network, Bluetooth, Near Field Communication (NFC), a 2nd-Generation (2G), 3rd-Generation (3G) or 4th-Generation (4G) or a combination thereof, so the corresponding communication component 805 may include a Wi-Fi module, a Bluetooth module and an NFC module.

In an exemplary embodiment, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method for transmitting response information.

In another exemplary embodiment, a computer-readable storage medium including a program instruction is also provided. The program instruction, when executed by the processor, implements the operations of the above method for transmitting response information. For example, the computer-readable storage medium may be the above memory 802 including the program instruction. The program instruction may be executed by the processor 801 of the electronic device 800 to complete the above method for transmitting response information.

The preferred implementations of the present disclosure are described in detail above in combination with the accompanying drawings. However, the present disclosure is not limited to the specific details in the above implementations. Within the scope of the technical concept of the present disclosure, a variety of simple variations of the technical solution of the present disclosure can be made, which belong to the protection scope of the present disclosure.

In addition, it is to be noted that the specific technical features described in the specific implementations may be combined in any appropriate way without conflict. In order to avoid unnecessary repetition, the present disclosure will not describe any possible combination mode separately.

In addition, the various embodiments of the present disclosure may also be combined in any way. As long as the combination does not violate the idea of the present disclosure, it shall also be regarded as the content of the present disclosure.

What is claimed is:

1. A method for transmitting response information, wherein in a sidelink communication system, User Equipment (UE) communicate directly with each other through a sidelink, and the UE comprise a data transmitter transmitting user data and a data receiver receiving the user data; the method is applied to the data transmitter in the sidelink communication system and comprises:
determining a location of a time-frequency resource for response information transmitted by the data receiver of the user data;
indicating the location of the time-frequency resource for transmission of the response information to the data receiver; and
receiving the response information from the data receiver at the location of the time-frequency resource,
wherein determining the location and indicating the location comprise:
determining and indicating a relative distance between the location of the time-frequency resource for the transmission of the response information and the location of the time-frequency resource for the user data corresponding to the response information,
wherein before receiving the response information from the data receiver at the location of the time-frequency resource, the method further comprises:
determining transmission power of the data receiver for transmitting the response information, and indicating the transmission power to the data receiver, wherein determining the transmission power of the data receiver for transmitting the response information comprises at least one of:
  obtaining a target interference signal intensity of the first other UE at the time-frequency resource for the transmission of the response information, and determining the transmission power based on the target interference signal intensity; or
  obtaining target interference signal energy at the time-frequency resource for the transmission of the response information, and determining the transmission power based on the target interference signal energy,
  wherein the transmission power is in a proportional relationship with the target interference signal intensity or the target interference signal energy.

2. The method of claim 1, wherein the determining a location of a time-frequency resource for the response information transmitted by the data receiver of the user data comprises at least one of:
  monitoring information transmission of first other UE than the data transmitter, and determining the location of the time-frequency resource for the transmission of the response information based on a monitoring result; or,
  measuring a signal interference of the first other UE at a target time-frequency resource, and determining the location of the time-frequency resource for the transmission of the response information based on a measurement result.

3. The method of claim 2, wherein
monitoring the information transmission of the first other UE than the data transmitter comprises:
receiving first control information from the first other UE, the first control information comprising indication information indicating a time-frequency resource for response information transmitted by the first other UE;
determining the location of the time-frequency resource for the transmission of the response information based on the monitoring result comprises:
determining the location of the time-frequency resource for the transmission of the response information from unoccupied time-frequency resources based on the first control information.

4. The method of claim 2, wherein
measuring the signal interference of the first other UE at the target time-frequency resource comprises:
measuring a first interference signal parameter of the first other UE at the target time-frequency resource, the first interference signal parameter comprising at least one of first interference signal intensity and/or first interference signal energy;
determining the location of the time-frequency resource for the transmission of the response information based on the measurement result comprises:
obtaining a first interference parameter threshold, and determining the location of the time-frequency resource for the transmission of the response information based on the first interference parameter threshold and the first interference signal parameter.

5. The method of claim 4, wherein when the first interference signal parameter comprises the first interference signal intensity, measuring the first interference signal parameter of the first other UE at the target time-frequency resource comprises:
measuring at least one of first reference signal intensity at the time-frequency resource for the user data and/or first control information transmitted by the first other UE, and estimating a first interference signal intensity at a subsequent time-frequency resource for the first other UE based on the measured first reference signal intensity.

6. The method of claim 5, wherein the first interference parameter threshold comprises a first interference strength threshold;
determining the location of the time-frequency resource for the transmission of the response information based on the first interference parameter threshold and the first interference signal parameter comprises:
determining the location of the time-frequency resource for the transmission of the response information from locations of time-frequency resources at which the first interference signal intensity is less than or equal to the first interference strength threshold.

7. The method of claim 4, wherein when the first interference signal parameter comprises the first interference signal energy, measuring the first interference signal parameter of the first other UE at the target time-frequency resource comprises:
measuring first received signal energy at the location of the target time-frequency resource, and estimating, based on the measured first received signal energy, first interference signal energy at a first offset time-frequency resource with a time-frequency offset from the target time-frequency resource.

8. The method of claim 7, wherein the first interference parameter threshold comprises at least one of a first interference energy threshold or a first ratio, the first ratio comprising a first percentage or a first quantity;
determining the location of the time-frequency resource for the transmission of the response information based on the first interference parameter threshold and the first interference signal parameter comprises:
when the first interference parameter threshold comprises the first interference energy threshold, determining the location of the time-frequency resource for the transmission of the response information from locations of time-frequency resources at which the first interference signal energy is less than or equal to the first interference energy threshold; or
when the first interference parameter threshold comprises the first ratio, determining the location of the time-frequency resource for the transmission of the response information from time-frequency resources with minimum first interference signal energy according to the first percentage or the first quantity.

9. The method of claim 4, wherein obtaining the first interference parameter threshold comprises at least one of:
obtaining the first interference parameter threshold that is preconfigured; or
when the data transmitter is within a coverage range of a base station, obtaining the first interference parameter threshold configured by the base station through downlink signaling.

10. The method of claim 1, wherein the relative distance between the location of the time-frequency resource and the location of the time-frequency resource for the user data corresponding to the response information comprises:
a location space between the time-frequency resource for the transmission of the response information and a time-frequency resource for latest user data in latest transmission.

11. The method of claim 10, wherein when the multiple data transmissions comprise repeated transmission of the user data on multiple time-frequency resources, indicating the location of the time-frequency resource for the transmission of the response information to the data receiver comprises:

indicating a location of a time-frequency resource for the transmission of each response information corresponding to each user data to the data receiver; or, merging same user data and indicating a time-frequency resource for the transmission of the response information corresponding to the merged user data to the data receiver.

12. The method of claim 1, wherein indicating the location of the time-frequency resource for the transmission of the response information to the data receiver comprises:

including the location of the time-frequency resource for the transmission of the response information into data scheduling information indicating a location of a time-frequency resource for the data transmission corresponding to the response information.

13. The method of claim 1, wherein a time difference between a starting resource unit of the time-frequency resource for the transmission of the response information and an ending resource unit of the time-frequency resource for the user data corresponding to the response information is greater than or equal to a preset time difference threshold.

14. The method of claim 1, wherein receiving the response information from the data receiver at the location of the time-frequency resource comprises:

attempting to receive the response information from the data receiver on a location of each time-frequency resource for the transmission of the response information.

15. A method for transmitting response information, wherein in a sidelink communication system, User Equipment (UE) communicate directly with each other through a sidelink, and the UE comprise a data transmitter transmitting user data and a data receiver receiving the user data; the method is applied to the data receiver in the sidelink communication system and comprises:

receiving locations of time-frequency resources for transmission of response information determined and indicated by the data transmitter;

determining at least one selected location of time-frequency resource from the locations of the time-frequency resources for the transmission of the response information indicated by the data transmitter; and after receiving the user data from the data transmitter, transmitting the response information to the data transmitter on the at least one selected location of the time-frequency resource, wherein receiving the locations of the time-frequency resources for the transmission of the response information indicated by the data transmitter comprises:

receiving relative distances between the locations of the time-frequency resources for the transmission of the response information and a location of a time-frequency resource for the user data corresponding to the response information, wherein before transmitting the response information to the data transmitter on the at least one selected location of the time-frequency resource, the method further comprises:

receiving transmission power indicated by the data transmitter;

wherein the transmission power is determined based on a target interference signal energy or target interference signal intensity, the target interference signal intensity or the target interference signal energy being obtained at the time-frequency resource for the transmission of the response information, and the transmission power is in a proportional relationship with the target interference signal intensity or the target interference signal energy.

16. The method of claim 15, wherein transmitting the response information to the data transmitter on the at least one selected location of the time-frequency resource comprises:

transmitting the response information to the data transmitter based on the transmission power on the at least one selected location of the time-frequency resource.

17. The method of claim 15, wherein determining at least one selected location of the time-frequency resource from the locations of the time-frequency resources for the transmission of the response information indicated by the data transmitter comprises:

determining a location of each time-frequency resource for the transmission of the response information as the at least one selected location of the time-frequency resource.

18. The method of claim 15, wherein determining at least one selected location of the time-frequency resource from the locations of the time-frequency resources for the transmission of the response information indicated by the data transmitter comprises at least one of:

monitoring information transmission of second other UE than the data receiver, and determining the at least one selected location of time-frequency resource based on a monitoring result; or measuring a signal interference of the second other UE on the locations of the time-frequency resources for the transmission of the response information, and determining at least one selected location of the time-frequency resource based on a measurement result.

19. The method of claim 18, wherein monitoring the information transmission of the second other UE than the data receiver comprises:

receiving second control information from the second other UE, the second control information comprising indication information indicating a time-frequency resource for the second other UE;

determining at least one selected location of the time-frequency resource based on the measurement result comprises:

determining unoccupied time-frequency resources from the time-frequency resources for the transmission of the response information, and determining the at least one selected location of the time-frequency resource from unoccupied time-frequency resources based on the second control information.

20. The method of claim 18, wherein measuring the signal interference of the second other UE on the locations of the time-frequency resources for the transmission of the response information comprises:

measuring a second interference signal parameter of the second other UE on the locations of the time-frequency resources for the transmission of the response information, the second interference signal parameter comprising second interference signal intensity and/or second interference signal energy;

determining the at least one selected location of the time-frequency resource based on the measurement result comprises:

obtaining a second interference parameter threshold, and determining the at least one selected location of the time-frequency resource based on the second interference parameter threshold and the second interference signal parameter.

21. The method of claim 20, wherein when the second interference signal parameter comprises the second interference signal intensity, measuring the second interference signal parameter of the second other UE on the locations of the time-frequency resources for the transmission of the response information comprises:
measuring at least one of a second reference signal intensity at a time-frequency resource for the user data or second control information transmitted by the second other UE, and estimating a second interference signal intensity at a subsequent time-frequency resource for the second other UE based on the measured second reference signal intensity.

22. The method of claim 21, wherein the second interference parameter threshold comprises a second interference strength threshold;
determining the at least one selected location of the time-frequency resource based on the second interference parameter threshold and the second interference signal parameter comprises:
determining the at least one selected location of the time-frequency resource from locations of time-frequency resources at which the second interference signal intensity is less than or equal to the second interference strength threshold.

23. The method of claim 20, wherein when the second interference signal parameter comprises the second interference signal energy, measuring the second interference signal parameter of the second other UE on the locations of the time-frequency resources for the transmission of the response information comprises:
measuring second received signal energy on the locations of the time-frequency resources for the transmission of the response information, and estimating, based on the second received signal energy, second interference signal energy at a second offset time-frequency resource with a time-frequency offset from the time-frequency resources for the transmission of the response information.

24. The method of claim 23, wherein the second interference parameter threshold comprises at least one of a second interference energy threshold or a second ratio, the second ratio comprising a second percentage or a second quantity;
determining the at least one selected location of the time-frequency resource based on the second interference parameter threshold and the second interference signal parameter comprises:
when the second interference parameter threshold comprises the second interference energy threshold, determining the at least one selected location of the time-frequency resource from locations of time-frequency resources at which the second interference signal energy is less than or equal to the second interference energy threshold; or
when the second interference parameter threshold comprises the second ratio, determining the at least one selected location of the time-frequency resource from time-frequency resources with minimum second interference signal energy according to the second percentage or the second quantity.

25. The method of claim 20, wherein obtaining the second interference parameter threshold comprises at least one of:
obtaining the second interference parameter threshold that is preconfigured; or
when the data receiver is within a coverage range of a base station, configuring the second interference parameter threshold through downlink signaling of the base station.

26. An electronic device implementing the method of claim 15, applied to the data receiver in the sidelink communication system and comprising:
a processor; and
memory for storing one or more instructions executable by the processor;
wherein the processor is configured to implement operations of the method.

27. An electronic device, wherein in a sidelink communication system, User Equipment (UE) communicate directly with each other through a sidelink, and the UE comprise a data transmitter transmitting user data and a data receiver receiving the user data; the electronic device is applied to the data transmitter in the sidelink communication system and comprises:
a processor; and
memory for storing one or more instructions executable by the processor;
wherein the processor is configured to determine a location of a time-frequency resource for response information transmitted by the data receiver of the user data, indicate the location of the time-frequency resource for the transmission of the response information to the data receiver, and receive the response information from the data receiver at the location of the time-frequency resource,
wherein the processor is further configured to determine and indicate a relative distance between the location of the time-frequency resource for the transmission of the response information and the location of the time-frequency resource for the user data corresponding to the response information,
wherein before receiving the response information from the data receiver at the location of the time-frequency resource, the processor is further configured to:
determine transmission power of the data receiver for transmitting the response information, and indicating the transmission power to the data receiver,
wherein determining the transmission power of the data receiver for transmitting the response information comprises at least one of:
obtaining a target interference signal intensity of the first other UE at the time-frequency resource for the transmission of the response information, and determining the transmission power based on the target interference signal intensity; or
obtaining target interference signal energy at the time-frequency resource for the transmission of the response information, and determining the transmission power based on the target interference signal energy,
wherein the transmission power is in a proportional relationship with the target interference signal intensity or the target interference signal energy.

* * * * *